United States Patent [19]

Thompson et al.

[11] Patent Number: 5,039,452
[45] Date of Patent: Aug. 13, 1991

[54] METAL OXIDE VARISTORS, PRECURSOR POWDER COMPOSITIONS AND METHODS FOR PREPARING SAME

[75] Inventors: Mark S. Thompson, San Carlos; Gary H. Wiseman, San Francisco; Edward S. Sherman, Sunnyvale, all of Calif.

[73] Assignee: Raychem Corporation, Menlo Park, Calif.

[21] Appl. No.: 193,970

[22] Filed: May 13, 1988

Related U.S. Application Data

[62] Division of Ser. No. 920,100, Oct. 16, 1986, abandoned.

[51] Int. Cl.$^5$ ............................................. H01B 1/06
[52] U.S. Cl. .................... 252/518; 252/519; 252/520; 252/521; 423/596
[58] Field of Search ............... 252/518, 519, 520, 521; 264/61; 423/593, 596, 598; 428/402, 702

[56] References Cited

U.S. PATENT DOCUMENTS

| | | | |
|---|---|---|---|
| 4,023,961 | 5/1977 | Douglas et al. | 75/5 AC |
| 4,094,061 | 6/1978 | Gupta et al. | 29/612 |
| 4,103,274 | 7/1978 | Burgess et al. | 338/21 |
| 4,142,996 | 3/1979 | Wong et al. | 252/518 |
| 4,198,443 | 4/1980 | Pitha | 427/34 |
| 4,258,839 | 8/1981 | Wong et al. | 252/519 |
| 4,416,963 | 11/1983 | Takimoto et al. | 430/69 |
| 4,436,650 | 3/1984 | Bowel | 252/518 |
| 4,452,729 | 6/1984 | Carlson et al. | 252/519 |
| 4,460,497 | 7/1984 | Gupta et al. | 252/519 |
| 4,510,112 | 4/1985 | Lauf | 264/234 |
| 4,527,146 | 7/1985 | Kanai et al. | 338/20 |
| 4,540,971 | 9/1985 | Kanai et al. | 338/21 |
| 4,551,268 | 11/1985 | Eda et al. | 252/519 |
| 4,575,440 | 3/1986 | Pallila | 264/61 |
| 4,681,717 | 7/1987 | Brooks | 252/518 |
| 4,767,729 | 8/1988 | Osman et al. | 501/94 |

OTHER PUBLICATIONS

Dosch et al., "Chemical Preparation of High Field Zinc Oxide Varistors," Sandia National Laboratories Report Sand85-0195, Technical Information Service, U.S. Dept. of Commerce (1985).
Tran et al., "Manufacture of Varistors Through Impregnation of a Commercial Zinc Oxide" (Mar. 1986).
World Patent Index No. 77-02164Y/02 (Abstract of DE 2,526,137 Supra) Lauf et al., Am. Ceram. Soc. Bull. 68(2), 278-81 (1981).

Primary Examiner—Josephine Barr
Attorney, Agent, or Firm—Tyuan Chao; Herbert G. Burkard

[57] ABSTRACT

This invention provides a process for making metal oxide varistor precursor powder comprising (a) dissolving soluble precursors of the additive metal oxides, e.g. bismuth nitrate as precursor for bismuth oxide, in an aqueous solution, (b) forming a suspension or slurry in the aqueous solution of a powder of the desired primary metal oxide, e.g. zinc oxide, having the desired particle size, (c) adding a precipitating reagent to convert the additive metal from the soluble precursor form to the oxide or hydrous oxide form and precipitate the oxide or hydrous oxide in the presence of the primary metal oxide particles, (d) removing water and by-product salts to form a powder. The resulting varistor precursor powder contains smaller particles of the additive metal oxides evenly distributed throughout larger particles of the primary metal oxide. Varistors prepared from the resulting powder can be sintered at temperatures lower than conventionlly used, for example 900° C.–1000° C. and the resulting varistors exhibit properties of volts per grain boundary value higher than conventional varistors for example 3.75 to 4.5 and dielectric constants lower than conventional varistors, e.g., under 1000.

8 Claims, No Drawings

METAL OXIDE VARISTORS, PRECURSOR POWDER COMPOSITIONS AND METHODS FOR PREPARING SAME

This application is a division of copending application Ser. No. 920,100, filed Oct. 16, 1986.

FIELD OF THE INVENTION

This invention relates to metal oxide varistor precursor powders, to processes for making the metal oxide varistor precursor powders and to varistors made from those powders.

BACKGROUND OF THE INVENTION

Metal oxide varistors such as zinc oxide varistors have classically been prepared by conventional ceramic techniques of mixing the metal oxide powders, typically by ball-milling, pressing the mixed powder into the desired shape and sintering to form varistors. It has been recognized that it is desirable to have a homogeneous mixture of the zinc oxide and the additive oxides. Various processes have been used to achieve varying degrees of homogeneity in various metal oxide varistor powders.

In U.S. Pat. No. 4,094,061 to Gupta et al. zinc oxide powder is mechanically mixed with various additive metal oxide powders which is then added to an aqueous binder solution and then freeze dried or spray dried to form a metal oxide varistor powder.

In U.S. Pat. No. 4,142,996 to Wong et al. the metal oxide precursors, such as salts, are precipitated from a solution to form a dehydrated melt, then calcined at temperatures up to 800° C. to form the oxides. The powder is then formed by spray drying.

U.S. Pat. Nos. 4,023,961 to Douglas et al. and 4,416,963 to Takimoto et al. illustrate various processes of spraying drying to obtain powder, including spraying in a burning furnace at 900° C.

In U.K. Pat. No. 1,518,184 to Blake the metal oxides are mixed with a carbohydrate material which is then burned off to leave agglomerates of metal oxide particles.

In Dosch et al. "Chemical Preparation of High Field Zinc Oxide Varistors", Sandia National Laboratories Report SAND85-0195, Technical Information Service, U.S. Dept. of Commerce (Sept. 1985) the metal oxide powders are prepared by coprecipitation as hydrous oxides and converted to oxalates by the addition of oxalic acid. After washing and drying the coprecipitate is calcined at 600° C. to produce the oxide mixture. Bismuth was then added as bismuth metal dissolved in nitric acid and the powders again calcined at 400° C. to produce the final powder which is then pressed into the desired shape and sintered at a temperature in the range of 675°–740° C. to form varistors.

In U.S. Pat. No. 4,575,440 to Palilla a solution is formed from soluble salts of precursors of the additive metal oxides. Zinc oxide powder is added to the solution to form a suspension. This suspension is dried to form a cake or a powder, which is then crushed, sieved and calcined at temperatures up to 800° C. to convert the additive metal oxide precursors and salts to the oxides. The calcined powder is ground, sieved and formed into a slurry which is then spray dried to form the final powder.

In U.S. Pat. No. 4,510,112 to Lauf and U.S. Pat. No. 4,540,971 to Kanai et al. The primary and additive metal oxides are either precipitated from solution separately and then mixed or the primary and additive metal oxides are simultaneously coprecipitated to form the mixture of metal oxide powders. See also Lauf et al. "Fabrication of High-Field Zinc Oxide Varistors by Sol-Gel Processing," Am. Ceram. Soc. Bull. 63(2), 270–81 (1984).

The disclosures of the above references are incorporated herein by reference.

We have not only observed that it is desirable to produce a metal oxide varistor precursor powder in which the average particle size of the primary metal oxide, such as zinc oxide, is relatively small, for example less than about 5 microns, we have determined that the average particle size of the zinc oxide should be significantly larger than the average particle sizes of the additive metal oxide components, for example the ratio of the radius, r, of the average particle sizes of the additive metal oxide components to the radius, R, of the average particle size of the zinc oxide should be less than 0.9.

We have determined that the dispersion or distribution of the particles of smaller additive metal oxides should be uniform among the larger particles of zinc oxide grains, for example there should be at least one particle of an additive metal oxide within a distance of 5R from each zinc oxide particle, where R is the average radius of the zinc oxide particle.

Therefore, it is an object of this invention to provide a metal oxide varistor precursor powder wherein the particles of additive metal oxides are smaller than the particles of zinc oxide and are uniformly distributed among the zinc oxide particles and to provide a process to produce such a metal oxide varistor precursor powder.

We have determined that in a desired range of zinc oxide particle sizes, e.g. between about 0.1 and about 5 microns, the various conventional mechanical and chemical processes and equipment for mixing and dispersing the smaller particles of additive metal oxides throughout the larger particles of zinc oxide are not sufficiently controllable and predictable in normal use to produce the desired uniformity of distribution and dispersion of the particles of additive metal oxides among the zinc oxide particles to produce the desired metal oxide varistor precursor powder. Therefore, it is an object of this invention to provide a controllable alternative to conventional mechanical or chemical means for mixing the additive metal oxides and the zinc oxide.

We have determined that in the varistor structure resulting from sintering the pressed metal oxide varistor precursor powder, it is desirable to have a uniform zinc oxide grain size and a uniform distribution of additive metal oxides among the zinc oxide grains. Therefore, it is an object of this invention to provide such a varistor and means for producing a varistor having the desired uniform grain size properties and distribution of additives after sintering.

We have determined that it is desirable to have in the varistor product, produced by pressing and sintering the metal oxide varistor precursor powder, a uniform grain boundary between zinc oxide grains, which provides a higher volts per grain boundary, and a lower dielectric constant compared to varistors having non-uniform grain boundaries. Therefore, it is an object of this invention to provide a varistor product having uniform grain boundaries between zinc oxide grains.

SUMMARY OF THE INVENTION

In one aspect, this invention provides a process for preparing a metal oxide varistor precursor powder comprising a primary metal oxide and one or more additive metal oxides, which comprises the steps:

(a) forming an aqueous solution comprising up to about 25 mole % (based on the additive metal oxides plus the primary metal oxide) of at least one soluble precursor of an additive metal oxide;

(b) mixing in said aqueous solution up to about 75 mole % of at least one primary metal oxide powder having an average particle size up to about 5 microns to form a suspension or slurry of the primary metal oxide powder in said solution;

(c) adding to the suspension or slurry a sufficient amount of a precipitation reagent to cause one or more of the dissolved additive metal oxide precursors to convert to an oxide or hydrous oxide and precipitate from said solution in the presence of said primary metal oxide powder in the form of an oxide or hydrous oxide;

(d) removing water and by-product salts from the suspension of primary metal oxide powder and precipitate of additive metal oxide or hydrous oxide; and (e) drying the powder and precipitate and forming a metal oxide varistor precursor powder.

In another aspect this invention provides a metal oxide varistor precursor powder which comprises at least one primary metal oxide having an average particle size radius R and at least one additive metal oxide having an average particle size radius r and wherein the ratio r/R is less than about 0.9.

In another aspect this invention provides a metal oxide varistor precursor powder having at least one particle of additive metal oxide within a distance of 5R from each primary metal oxide particle, where R is the average radius of the primary metal oxide particles.

In another aspect, this invention can provide a sintered metal oxide varistor having a conventional dielectric constant or can provide a sintered metal oxide varistor having a dielectric constant less than about 1200.

DESCRIPTION OF THE INVENTION

The process of the present invention provides a controllable means of preparing metal oxide varistor precursor powder having the desired average particle size of the zinc oxide, having the desired average particle size of the additive metal oxides and having the desired distribution of the additive metal oxide particles throughout the zinc oxide particles. In its basic aspect this process involves dissolving soluble forms of the additive metals in aqueous solution, adding to the solution zinc oxide powder to form a suspension or slurry and precipitating the additive metals in the form of oxides or hydrous oxides directly onto or among the particles of insoluble zinc oxide powder present in the suspension or slurry. Most of the water is then removed and the by-product salts washed from the resulting powder and most of the wash water is removed to leave a wet powder. Although the resulting powder can be dried to dryness and mechanically ground to a desired particle size, the full advantage of this invention is realized when the resulting powder is kept wet then spray dried or freeze dried. The above wet powder mass remaining when water is removed can be in the form of a slurry or can be in the form of a wet cake, provided that it remains dispersible for drying. This wet powder mass is then dispersed in a liquid medium, usually aqueous, with conventional additives and processing aids, such as polyvinyl alcohol, carbowax, Darvan "C" deflocculent, and the like, to make the dispersion suitable for spray drying. The resulting spray dried powder is free flowing and exhibits the desired properties outlined above and particularly the property of the additive metal oxide particles being smaller and evenly distributed among the larger zinc oxide particles.

Good control of the metal oxide varistor precursor powder preparation can be exercised through the variables of the process of this invention. The zinc oxide powder can be prepared by any of the conventional mechanical, chemical or precipitation methods to provide the desired average particle size and other desired properties or characteristics. Once the desired zinc oxide powder is selected for use in the process of this invention, the average particle size of the powder does not change significantly through the process of this invention, because of the absence of mechanical processing, although the usual agglomeration of particles may occur in the spray drying or other drying processes. However, such agglomeration does not affect the relative particle sizes of the additive metal oxides and the zinc oxide particles or the distribution of the smaller additive metal oxide particles throughout the larger zinc oxide particles.

The average particle sizes of the additive metal oxides can be controlled during the precipitation of the additive metal oxides or hydrous oxides onto or among the zinc oxide particles through the selection and concentration of the soluble precursor of the additive metal oxide in the starting solution, the reaction rate, the selection and rate of addition of the precipitation reagent, the precipitation rate, temperature, pH, mixing and other conditions employed during the conversion of the soluble additive metal oxide precursor to the additive metal oxide or hydrous oxide and during the precipitation of the additive metal oxide or hydrous oxide onto or among the zinc oxide particles. The amount of insoluble zinc oxide powder present in the solution as a suspension or slurry, i.e., the percent solids of zinc oxide, during the reaction and precipitation will also affect the average particle size and distribution of the additive metal oxide particles on or among the zinc oxide particles. It will be recognized that a small amount of the zinc oxide will dissolve in the solution and the remainder of the zinc oxide will be insoluble and form the desired suspension or slurry in the solution. The amount of zinc oxide that dissolves in the solution is not significant, except from the standpoint that it affects the pH of the solution.

The desired uniform distribution of the additive metal oxide particles throughout the zinc oxide powder will inherently result from the process of this invention, provided that the solution is adequately mixed and the dispersion, suspension or slurry of zinc oxide powder in the solution is maintained substantially uniform during at least the precipitation and preferably the conversion and precipitation of the additive metal oxides or hydrous oxides. It may be desirable in most instances to use a dispersant, such as Darvan C, to assure that the zinc oxide powder remains adequately mixed and dispersed during the conversion and precipitation of the additive metal oxides and hydrous oxides.

When removing the water and the by-product salts resulting from the precipitation, it is desirable in most instances to avoid completely drying the resulting wet metal oxide varistor precursor powder mass. If the resulting wet powder mass is dried too dry, the powder may form solid agglomerates or a cake which would then need to be crushed and sieved by mechanical means. In some instances such mechanical processing may be acceptable, but in most cases such mechanical processing would not provide the desired precursor powder uniformity and which is provided by the complete process of this invention. When the salts and various by-products of the reaction and precipitation are removed and the water extracted, it is desirable to merely keep the resulting wet powder mass in a form that it is readily dispersible in a liquid medium suitable for spray drying or other substantially equivalent drying processes, such as freeze drying.

The wet powder mass can normally be prepared for conventional spray drying by adding water to give about a 25–60% solids slurry and using appropriate processing aids, such as polyvinyl alcohol, carbowax and a deflocculent. The slurry can be spray dried on conventional spray drying equipment to produce a dry free-flowing metal oxide varistor precursor powder having the desired properties outlined above. Any suitable spray drying, freeze drying or other dry powder preparation process can be used to produce the final dry free-flowing metal oxide varistor precursor powder from the wet powder mass.

It is understood that in the discussion and description of the present invention, reference to zinc oxide is intended to be reference to the primary metal oxide for the varistor and that this invention is equally applicable to any of the primary varistor metal oxides exhibiting varistor properties when appropriately doped with additive metal oxide dopants. Such primary varistor metal oxides include but are not limited to zinc oxide (ZnO), titanium oxide ($TiO_2$), strontium oxide (SrO), strontium titanate ($SrTiO_3$) and mixtures thereof.

In the description of this invention, it is understood that the reference to additive metals or additive metal oxides is intended to include any of the additive metal oxides for varistors which can be used as dopants or sintering aids for or with the primary metal oxide. These additive metal oxides include but are not limited to $Al_2O_3$, $B_2O_3$, BaO, $Bi_2O_3$, CaO, CoO, $Co_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, $TiO_2$ and mixtures thereof. In addition, various other additives which are known in the varistor art may be included.

The proportions of the primary metal oxide and additive metal oxides will generally be in the range of about 75 mole % to about 99 mole % primary metal oxide and in the range of about 1 to about 25 mole % additive metal oxides, and preferably about 90 to about 98 mole % primary metal oxide and about 2 to about 10 mole % additive metal oxides. A preferred additive metal oxide is bismuth oxide ($Bi_2O_3$) which is usually present in amounts ranging from about 0.5 mole % to about 4.0 mole % and is usually present along with various other metal oxides. It is particularly preferred to use along with the bismuth oxide, at least one or more of manganese oxide ($MnO_2$), chromium oxide ($Cr_2O_3$), cobalt oxide ($Co_3O_4$), boron oxide ($B_2O_3$), tin oxide (SnO or $SnO_2$) and antimony oxide ($Sb_2O_3$).

In the practice of this invention, the additive metal oxides are formed from soluble additive metal oxide precursors, which are the water soluble forms of the desired additive metal. These precursors may be nitrates, carbonates, chlorides, acetates and the like. An additive metal oxide precursor should be sufficiently soluble in the solution in the presence of the other dissolved additive metal oxide precursors and in the presence of the dispersed, suspended or slurried zinc oxide powder in order that the desired amount of additive metal oxide or hydrous oxide can be precipitated on or among the zinc oxide particles. Some examples of soluble additive metal oxide precursors are: for bismuth, $Bi(NO_3)_3.5H_2O$ dissolved in dilute nitric acid or $Bi_5O(OH)_9(NO_3)_4$; for antimony, $SbCl_3$ or $K(SbO)C_4H_4O_6.\frac{1}{2}H_2O$; for cobalt, $Co(NO_3)_2.6H_2O$; for manganese, $Mn(C_2H_3O_2)_2.4H_2O$; for lead, $Pb(C_2H_3O_2)_2$; for chromium, $Cr(NO_3)_3.9H_2O$; for aluminum, $Al(NO_3)_3.9H_2O$; and the like. The selection of the soluble additive metal oxide precursor for inclusion in the aqueous solution prior to precipitation in the desired concentration to provide the desired amount of the additive metal oxide on the zinc oxide powder will be apparent to one skilled in the art following the principles of the present invention and the specific examples and embodiments disclosed herein.

In some cases it may be desirable to dissolve one or more soluble additive metal oxide precursors in the solution, add the primary metal oxide powder to form the suspension or slurry, convert and precipitate that or those additive metal oxides or hydrous oxides, then dissolve one or more other soluble additive metal oxide precursors in the solution (slurry) and convert and precipitate that or those additional additive metal oxides or hydrous oxides. Such series introduction of additive metal oxide precursors and the conversion and precipitation of the oxides and hydrous oxides onto or among the primary metal oxide particles can be repeated as desired. It should also be noted that in some cases the addition of the zinc oxide powder or other primary metal oxide powder will cause the conversion and precipitation or at least the precipitation of one or more additive metal oxides or hydrous oxides, for example by causing a pH change. This can be an advantageous procedure to use because of the speed at which the additive metal oxide or hydrous oxides can be formed and/or precipitated and can be particularly suited to a continuous process for practicing this invention.

The primary metal oxide powder, such as zinc oxide powder, added to the solution of soluble additive metal oxide precursors can be any desired primary metal oxide powder having the desired average particle size and other properties, such as particle size distribution, surface area, density and the like. The primary metal oxide powder should have a minimum of impurities particularly any impurities which would interfere with forming or maintaining the aqueous solution, precipitating the additive metals onto or among the primary metal oxide powder or sintering, or the grain growth during sintering, of the pressed powder or forming the grain boundaries between the grains of the primary metal oxide formed during sintering of the varistor.

The most used and generally preferred primary metal oxide powder is zinc oxide. In general it is preferred that the primary metal oxide powder have an average particle size in the range of about 0.1 to about 5 microns, more preferably about 0.1 to about 2 microns, more preferably about 0.1 to about 1 micron.

The percent solids of the primary metal oxide powder in the solution during the precipitation of the additive metal oxides or hydrous oxides in general should be between about 1 and about 50 wt %, preferably between about 5 and about 40 wt % and usually more preferably between about 10 and about 30 wt %. The concentration of primary metal oxide powder solids present in the solution should be high enough to provide an adequate density of particles and sites for the additive metal oxides or hydrous oxides to precipitate on or between and allow the precipitation to occur in a uniform, evenly distributed manner.

It is important to maintain adequate mixing or agitation of the dispersion, suspension or slurry during the precipitation of the additive metal oxides or hydrous oxides to assure a uniform distribution of the additive metal oxides or hydrous oxides throughout the primary metal oxide particles. As mentioned above, it may be desirable to use a dispersing agent to assist in maintaining an adequately uniform suspension or slurry during mixing and precipitation. The percent solids and degree of mixing can be used to control the particle size of the resultant additive metal oxide particles. If the percent solids of primary metal oxide powder is too low or the degree of mixing of the suspension or slurry in the solution is inadequate, the additive metal oxides or hydrous oxides may form larger particles than desired or may form agglomerates with themselves rather than the desired uniform distribution of small additive metal oxide or hydrous oxide particles throughout the larger primary metal oxide particles.

The "precipitation reagent" can be any appropriate material or combinations of materials which cause the soluble additive metal oxide precursors dissolved in solution to be converted to metal oxides or hydrous oxide and precipitate in the presence of, onto or among the primary metal oxide particles suspended or slurried in the aqueous solution. The selection of the appropriate precipitation reagent will depend on the particular dissolved soluble additive metal oxide precursors present in the aqueous solution, the concentrations of the additive metal oxide precursors in the solution, the pH of the solution and other factors, such as the percent solids of the primary metal oxide powder. Adjusting the pH is usually the most convenient way to control the initiation and rate the conversion and precipitation. In some instances, a combination of materials will be necessary where one precipitation reagent converts and/or precipitates one or more soluble additive metal oxide precursors and another precipitation reagent converts and/or precipitates one or more other soluble additive metal oxide precursors to the oxide or hydrous oxide. In general, the precipitation reagent can be aqueous, organic or inorganic bases, such as $NH_4OH$, $NR_4OH$, $NaOH$, and the like. The precipitation reagent may include a pH modifier or pH buffer or may itself adjust the pH of the solution to facilitate the appropriate conversion of the soluble additive metal oxide precursors to metal oxides or hydrous oxides and the precipitation of the metal oxide or metal oxide hydrates. It has been observed in many solutions that the zinc oxide powder itself will change and sometimes buffer the pH of the solution.

It should be noted that in some cases the precipitation reagent may not itself cause the precipitation of the additive metal oxide or hydrous oxide, but may only convert the additive metal to the oxide or hydrous oxide form, which then precipitates due to some other change, such as removal of water, change in pH, and the like. In some instances the conversion likewise may not take place until water is removed or another reagent is added.

The term "hydrous oxide" is used herein to mean the compound or material that can be converted to the oxide by removal of water. These hydrous oxides include such forms as oxide hydrates, hydroxides and the like. The hydrous oxide referred to herein may convert to the oxide form at any stage: during removal of water from the suspension or slurry, during the drying or other processing of the powder, such as during the spray drying or freeze drying, or during the pressing or sintering of the powder to form the varistor. Although calcining will not normally be necessary when practicing this invention, it does not preclude the uptake of oxygen during the drying, pressing, sintering or other processing associated with the use of this invention or the calcining of the precursor powder in a separate step, if desired.

When the precipitation reagent addition is complete and the conversion is effected, water is normally removed from the suspension or slurry by filtration, settling and decanting, centrifuging or by other conventional liquid-solids separation means. The solids are then washed to remove the by-products of the conversion reaction, such as salts. A preferred method of removing the water and washing out the impurities and reaction by-products is by filtration.

The resulting solids can be dried at this point, but if dried too dry will usually form hard cakes or agglomerates which will require subsequent grinding, sieving and similar mechanical processing to form a varistor precursor powder before pressing to form varistors. While this may be adequate for some uses, it does not produce the uniform particles generally preferred in the practice of this invention.

It is generally preferred that the solids remaining after removal of water and reaction byproducts not be dried to a degree of dryness which will cause the particles to agglomerate and require mechanical processing such as grinding for subsequent use. The solids are preferably kept wet enough so that the particles can be dispersed, suspended or slurried in a liquid medium without grinding or crushing. The wet solids which can be so dispersed are referred to herein as a wet powder. The wet powder is preferably spray dried from a conventional slurry or freeze dried by conventional processes to form a dry free-flowing powder. Other methods of drying the powder may also be used.

It is not necessary in all cases to have a free-flowing powder. However, the powder should be dry enough to be pressed in mechanical presses conventionally used to form varistors and should have a low enough water content so that water volatilizing during sintering does not cause structural damage to the varistor. In general, a water content less than about 5% by weight is desired.

The metal oxide varistor precursor powder according to this invention is particularly unique because it contains a uniform distribution of the relatively smaller particles of additive metal oxides throughout the relatively larger particles of primary metal oxide, such as zinc oxide.

It has been found that it is desirable to have a ratio of the average radius of the additive metal oxide particles, $r$, to the average radius of the zinc oxide particle, $R$, i.e. $r/R$, to be less than 0.9. Preferably, this ratio should be less than 0.8 and more preferably less than about 0.6. The most preferred range for the $r/R$ ratio is from about 0.1 to about 0.4. It has been observed that this ratio of additive to primary metal oxide particle sizes in metal oxide varistor precursor powders prepared by conventional mechanical or chemical processes will range from about 1.3 to about 4.2 or even higher in some cases. Emperically, one would expect that it would be normal to obtain an r/R ratio of 1.0 when the zinc oxide powder and additive metal oxide powders are all extensively ball-milled in a single mixture. However, this does not appear to be the result obtained from such mechanical grinding and mixing.

It is believed that the even distribution of the smaller sized additive metal oxide particles throughout the larger sized zinc oxide particles provided by this invention results in a number of advantages, including better densification, densification completed over a narrower temperature range, more uniform grain growth during sintering, more uniform grain boundary properties in the sintered varistor, a better controlability of the average grain size in the sintered varistor, the lower sintering temperature, as well as other desired properties.

The r/R ratio can be varied and controlled by producing the desired additive metal oxide average particle size r using the present invention and selecting the zinc oxide powder to have the average particle size for the desired R, which size R does not change significantly through the solution, slurry, conversion and precipitation portions of the process of this invention. The radius r of the average particle sizes of the additive metal oxides can be controlled with the concentration of the dissolved additive metal oxide precursor in the aqueous solution, the rate of conversion and/or precipitation of the additive metal oxide or hydrous oxide from the aqueous solution and the solids content of the zinc oxide powder present in the aqueous suspension or slurry during the precipitation. Other factors affecting r and the r/R ratio are the concentration of the precipitation reagent and the rate, method and degree of mixing the zinc oxide powder and the dissolved additive metal oxide precursors. These and other factors can be varied to produce metal oxide varistor precursor powders having the desired r/R ratio. Modifications and alterations of the process may be made, including combinations of some mechanical processing, to provide a desired metal oxide varistor precursor powder having the desired r/R ratio, provided that the resulting ratio of average particle sizes and the resulting distribution of the smaller additive metal oxide particles throughout the larger zinc oxide particles are within the generally desired ranges.

In the metal oxide varistor precursor powder, the uniform distribution of the additive metal oxide particles throughout the zinc oxide particles resulting from the process of this invention can be defined as having at least one additive metal oxide particle within a distance of 5R from each zinc oxide particle. Preferably there will be at least one additive metal oxide particle with 3R of each zinc oxide particle, and more preferably within 2R and most preferably within 1R. Even more preferable is to have two or more additive metal oxide particles within said distances from each primary metal oxide particle. It is particularly preferred that at least one of the additive metal oxide particles within said distances be a bismuth oxide particle. This uniform distribution characteristic and property of the varistor precursor powders prepared according to this invention can be observed and measured by transmission electron microscopy in conjunction with x-ray microanalysis.

After spray drying the primary metal oxide powder containing the additive metal oxides, the resulting metal oxide varistor precursor powder is normally a free-flowing dry powder which can be pressed into appropriate configurations using conventional presses, and conventional pressures to form varistors, high voltage surge arrestor disks and other desired components having conventional or other desired sizes and configurations. The pressed articles are then sintered at appropriate temperatures for the particular metal oxide varistor precursor powder obtained from the process of this invention.

In general it has been found that the process of this invention produces metal oxide varistor precursor powders which can be sintered at substantially lower temperatures than conventional metal oxide varistor precursor powders. For example in many cases the powder produced by the process of this invention can be sintered in the range of 900°–1000° C. but can be sintered as low as 750° C. and as high as 1500° C., depending on the composition of the powder and the grain size and other properties desired in the resulting sintered varistor. In general, it has been found that the lower sintering temperatures are particularly useful with the metal oxide varistor precursor powder made according to this invention because the higher temperatures produce more, and sometimes undesirable, grain growth in the final varistor product.

A preferred sintering temperature in the range of 900°–1100° C. will be appropriate in most cases and will produce the optimum grain size and grain boundary characteristics in the sintered varistor. Some examples of preferred firing and sintering schedules are as follows. For 1.27 cm (0.50 inch) pellets, heat from 50° C. to 550° C. in 3.5 hr. (143°/hr) and hold for 30 min., heat to 750° C. in 30 min (400°/hr), heat to 900° C. in 1.5 hr (100°/hr) heat to 1050° C. in 30 min (300°/hr) then hold at 1050° C. for 30 min. For 5.08 cm (2 inch) for surge arrestor applications, heat from 50° C. to 550° C. in 8 hr (62.5°/hr) and hold for 1 hour, heat to 750° C. in 2 hr (100°/hr) heat to 900° C. in 4 hr (37.5°/hr), heat to 1050° C. in 1 hr (150°/hr) and then hold 30 minutes. Cooling rates can be as conventionally used for varistors.

The sintered varistors prepared from the metal oxide varistor precursor powders of this invention exhibit unique properties resulting, it is believed, primarily from the uniform distribution of the smaller additive metal oxide particles throughout the larger primary metal oxide particles, the uniform grain growth during sintering, and the uniform grain boundary characteristics. The sintered varistor according to the present invention can be characterized by a measurement on a cross-sectioned face of the varistor in terms of grain size per grain boundary intercepts along a straight line across the cross-section surface of the sintered varistor.

The grain size of the sintered varistor is measured by cross-sectioning the sintered varistor perpendicular to the electroded surfaces and polishing using standard metallographic techniques. The polished surface is then slightly etched with a normally used etching solution, such as a mixture of 12 grams ammonium chloride dissolved in 50 ml ammonium hydroxide and 50 ml distilled water for 30 seconds. Examination by optical microscopy in reflected light or scanning electron microscopy clearly resolves boundaries between zinc oxide grains and other phases which are present. The grain size was measured by the linear intercept technique as defined in ASTM procedure E112-84, procedure 10. It has been shown that the mean intercept length, L, is related to the grain size, D, by formula $D = 1.6 \times L$, as discussed in Haroun, *J. Material Science*, 16, p. 2257 (1981) and Feltham, *Acts Mets.*, 5, p. 97 (1957).

In terms of electrical characteristics, varistors formed from the metal oxide varistor precursor powders of this invention exhibit higher volts per grain boundary at breakdown voltage than typically observed in conventional varistors and in general have lower dielectric constants than typically exhibited in conventional varistors.

The current-voltage response of varistors can be measured in three stages. For low current measurements, a computer-controlled operational amplifier is used to step up DC voltage to the sample until the current through the sample as measured on an ammeter reached 1 mA. For the second stage, a single 60 Hz AC triangular wave is applied. The current through the varistor generated a voltage across a 10 ohm shunt resistor and the resulting current-voltage waveforms are captured on an oscilloscope. Finally, capacitive discharge pulses of increasing voltage are applied and the current monitored using a 0.1 ohm shunt resistor and captured on the oscilloscope at a sampling rate of 10 MHz. Voltage and current readings are taken at the point where the change in voltage with time (dV/dt) is zero. Typically, a total of 100 current-voltage points are taken for each sample.

The average switching voltage per grain boundary, $V_{gb}$, is calculated from the linear intercept measure of the average grain size, D, the sample thickness, $t_s$, and the sample switch voltage, $V_s$, at 1 mA per square centimeter using the formula: $V_{gb}=(V_s)(D)/t_s$. The volts per grain boundary of the varistors of this invention are generally greater than about 3.5, preferably greater than about 3.75 and more preferably in the range of about 3.75 to about 4.5

The dielectric constant of the varistors according to the present invention is generally under about 1200, preferably under about 1000, more preferably less than about 950 and most preferably less than about 700 (measured at 60 Hz).

The varistors prepared according to the present invention can be electroded in conventional ways, for example by painted silver electrodes or other conventional electrodes used on zinc oxide varistors. Other useful electrodes include indium-gallium eutectic, aluminum and zinc electrodes. Conventional surface preparations, coatings, passivating coatings and other additives or materials normally used with electroding varistors can be used with the varistors of this invention.

Devices made from the varistors prepared according to the present invention, such as high voltage surge arrestors, circuit protectors, etc., can be constructed in conventional configurations using conventional materials.

To better illustrate the present invention, the following examples are set forth in detail. Examples 1-3 illustrate the processes, metal oxide varistor precursor powder and varistors of the present invention. Examples 4 and 5 are examples of prior art processes, metal oxide varistor precursor powders and resulting varistors.

EXAMPLE 1

Preparation of Varistor Precursor Powder—Batch Coprecipitation Method

Simultaneous coprecipitation of Bi, Co, Cr, and Mn hydrous oxides by hydrolysis of the appropriate metal salts was carried out in the presence of ZnO. A slurry of ZnO was prepared by dispersing 15.87 g ZnO (195 mmol, 97.5 mol % Zn) in 360 ml $H_2O$. With stirring, 10 ml $NH_4OH$ was added to this slurry. A solution of bismuth nitrate was prepared in another containing by dissolving 14.62 g $Bi_5O(OH)_4(NO_3)_4$, (50.0 mmol Bi) in 25.0 ml conc. $HNO_3$ and 25 ml $H_2O$ and then slowly diluting the solution to 1.00 l. To 40 ml of this solution (2.00 mol, 1.00 mol % Bi) was added 0.248 g $Cr(OOCCH_3)_3.H_2O$ (1.00 mmol, 0.50 mol % Cr), 0.245 g $Mn(OOCCH_3)_3.4H_2O$ (1.00 mmol, 0.50 mol % Mn), and 0.249 g $Co(OOCCH_3)_2.4H_2O$ (1.00 mmol, 0.50 mol % Co). The concentration of this dopant solution was thus 0.050 M Bi, 0.0028 M Co, Cr, and Mn, and 0.39 M $HNO_3$. The dopant solution was rapidly added to the ZnO slurry and stirred for 15 minutes. The slurry was filtered in a Buchner funnel and the filter cake was dried at 140° C. The powder was crushed and sieved to <200 mesh. Disks measuring 1.27 cm (0.50 inch) by 0.064 cm (0.025 inch) were pressed from the powder and sintered at 1000° C. for 30 minutes. Silver paint electrodes were applied to electrical testing.

EXAMPLE 2

Preparation of Varistor Precursor Powder - Batch Coprecipitation Method, Contains 3% Bismuth.

A slurry of ZnO was prepared by dispersing 500 g ZnO (6.15 mol, 95.5 mol % Zn) in 2000 ml $H_2O$. With stirring, 75 ml $NH_4OH$ was added to this slurry. A solution of bismuth nitrate was prepared in another containing by dissolving 292.4 g $Bi_5O(OH)_9(NO_3)_4$, (1.00 mol Bi) in 350 ml conc. $HNO_3$ and 350 ml $H_2O$ and then slowly diluting the solution to 5.00 l. To 922 ml of this solution (0.184 mol, 3.00 mol % Bi) was added 8.27 g $Cr(OOCCH_3)_3.H_2O$ (33.3 mmol, 0.50 mol % Cr), 8.17 g $Mn(OOCCH_3)_3.4H_2O$ (33.3 mmol, 0.50 mol % Mn), and 8.30 g $Co(OOCCH_3)_2.4H_2O$ (33.3 mmol, 0.50 mol % Co). The concentration of this dopant solution was thus 0.200M Bi, 0.036 M Co, Cr, and Mn, and 1.099M $HNO_3$. The dopant solution was added to the ZnO slurry dropwise over 20 minutes and then stirred for another 15 minutes. The slurry was filtered in a Buchner funnel. The filter cake was redispersed in a solution containing 1.5 wt. % polyvinyl alcohol (PVA) and 1.5 wt. % polyethylene glycol (PEG) and the slurry dried by rotary evaporation to dryness. The powder was crushed and sieved to <270 mesh. Disks measuring 1.27 cm (0.50 inch) by 0.064 cm (0.025 inch) were pressed from the powder and sintered as in Example 1. Silver paint electrodes were applied for electrical testing.

EXAMPLE 3

Preparation of Varistor Precursor Powder—Coprecipitation Method

Simultaneous coprecipitation of Bi, Co, Cr, and Mn hydrous oxides by hydrolysis of the appropriate metal salts was carried out in the presence of ZnO and $Sb_2O_3$ in a continuous reactor. A slurry of ZnO and $Sb_2O_3$ was prepared by dispersing 80.51 g ZnO (989 mmol, 95.4 mol % Zn) and 0.146 g $Sb_2O_3$ (1.00 mmol, 0.10 mol % Sb) in 1440 ml $H_2O$ containing 0.41 g Darvan C dispersant. With stirring, 41.3 ml $NH_4OH$ was added to this slurry. A solution of bismuth nitrate was prepared in another container by dissolving 14.62 g $Bi_5O(OH)_9$. $(NO_3)_4$ (50.0 mmol Bi) in 25.0 ml conc. $HNO_3$ and 25 ml $H_2O$ and then slowly diluting the solution to 1.00 l. To 622 ml of this solution was added 1.28 g $Cr(OOCCH_3)_3.H_2O$ (5.20 mmol, 0.50 mol % Cr), 1.29 g Mn(OOCCH$_3$)3.4H$_2$O (5.20 mmol, 0.50 mol % Mn), and 1.27 g Co(OOCCH$_2$)2.4H$_2$O (5.20 mmol, 0.50 mol % Co). The concentration of this dopant solution was thus 0.100M Bi, 0.0084M Co, Cr, and Mn, and 0.39M HNO$_3$. Coprecipitation of the dopant hydrous oxides was accomplished by pumping the ZnO slurry and the dopant solution via tygon tubing into a "Y" reactor at 33 ml/min and 76 ml/min, respectively, and then into a stirred tank. The slurry was stirred for 5 min. and then filtered. The filter cake was redispersed in an aqueous binder solution containing 3 wt % PVA and 1 wt % polyethylene glycol (PEG) and then dried by rotary evaporation. The powder was crushed and sieved to <140 mesh (106 micron). Disks measuring 1.27 cm (0.50 inch) by 0.064 cm (0.025 inch) were pressed and the binder burned out by heating from 50° to 550° C. over 3.5 hour at a temperature ramp up of 2.4° C. per minute. The pellets were sintered at 1100° C. for 12 minutes and silver paint electrodes were applied.

EXAMPLE 3A

Preparation of Varistor Precursor Powder—Coprecipitation Method

Simultaneous coprecipitation of Bi, Co, Cr, and Mn hydrous oxides by hydrolysis of the appropriate metal in a continuous reactor. A slurry of ZnO and Sb$_2$O$_3$ was prepared by dispersing 10.6 Kg ZnO (130.2 mole, 94 mol % Zn) and 201 g Sb$_2$O$_3$ (1.4 mole, 1 mol % Sb) in 3791 H$_2$O containing 106 g Darvan C dispersant. With stirring, 3.1 l ml NH$_4$OH was added to this slurry. A solution of bismuth nitrate was prepared in another container by dissolving 2.02 Kg Bi(NO$_3$)$_3$ (4.2 mole Bi) in 1.3 l conc. HNO$_3$ and 1.3 l H$_2$O and then slowly diluting the solution to 38.9 l. To this solution was added 277.4 g Cr(NO$_3$)$_3$·6H$_2$O (0.69 mole, 0.50 mol % Cr), 239.7 g Mn(NO$_3$)$_3$·4H$_2$O (0.69 mole, 0.50 mol % Mn) and 201.5 g Co(NO$_3$)$_2$·6H$_2$O (0.69 mole, 0.50 mol % Co). The concentration of this dopant solution was thus 0.100M Bi, 0.018M Co, Cr, and Mn, and 0.39M HNO$_3$. Coprecipitation of the dopant hydrous oxides was accomplished by pumping the ZnO slurry and the dopant solution via tygon tubing into a "Y" reactor at 500 ml/min and 500 ml/min, respectively, and then into a stirred tank. The slurry was stirred for 5 min. and then filtered. The filter cake was redispersed in an aqueous binder solution containing 15 wt % PVA and 05 wt % and 55.64 g B(OH)$_3$ (0.5 mole %) polyethylene glycol (PEG) and then spray dried Disks measuring 5.08 cm (2 inches) by 2.29 cm (0.9 inch) were pressed and the binder burned out by heating from 50° to 550° C. over 3.5 hour at a temperature ramp up of 2.4° C. per minute. The pellets were sintered at 1050° C. for 30 minutes and silver paint electrodes were applied.

EXAMPLE 4

Preparation of Varistor Powder—Ball-Mill Method

An 86 gram batch of varistor powder was prepared as described in Example 1 of U.S. Pat. No. 4,094,061 by ball-milling 77.6 g ZnO (Cerac Z-1012, 95.4 mol % Zn), 0.146 g Sb$_2$O$_3$ (Cerac 5357, 0.10 mol % Sb), 6.99 g Bi$_2$O$_3$ (Cerac 5947, 3.00 mol % Bi), 0.375 g CoO (Cerac 13598-A-13, 0.50 mol % Co), 0.380 g Cr$_2$O$_3$ (Cerac 6036, 0.50 mol % Cr), and 0.355 g MnO (Aesar 010683, 0.50 mol % Mn). The slip was dried by rotary evaporation and the powder crushed and sieved to <80 mesh (180 micron). Varistor disks measuring 1 cm diameter by 0.1 cm thick were pressed and fired as described in Example 3 above.

EXAMPLE 5

Preparation of Varistor Powder—"SOL-GEL" Method

A varistor powder consisting of 95.4 mol % Zn, 0.10 mol % Sb, 3.0 mol % Bi, 0.50 mol % Co, 0.50 mol % Cr, and 0.50 mol % Mn was prepared by separately precipitating hydrous oxides of the above elements and combining them as described in "Fabrication of High-Field Zinc Oxide Varistors by Sol-Gel Processing," *American Ceramic Society Bulletin*, Vol. 63, No. 2, p. 278, February 1984 and U.S. Pat. No. 4,510,112. Thus, 283.8 g Zn(NO$_3$)$_2$·6H$_2$O (954 mmol, 95.4 mol % Zn), 0.23 g SbCl$_3$ (1.00 mmol, 0.10 mol % Sb), 8.70 g Bi$_5$O (OH)$_9$(NO$_3$)$_4$ (30.0 mmol Bi, 3.00mol % Bi), 1.455 g Co(NO$_3$)$_2$·6H$_2$O (5.00 mmol, 0.50 mol % Co), 2.00 g Cr(NO$_3$)$_3$·9H$_2$O (5.00 mmol, 0.50 mol % Cr) and 0.99 g MnCl$_2$ (5.00 mmol, 0.50 mol % Mn) were dissolved in separate flasks in the appropriate amount of H$_2$O (including HCl for SbCl$_3$ and HNO$_3$ for Bi$_5$O (OH)$_9$.(NO$_3$)$_4$) and then precipitated with NH$_4$OH. The precipitates were each filtered and washed. The precipitates were then mixed in 200 ml H$_2$O in a high speed blender. This slurry was filtered and dried at 110° C., then calcined at 250° C. in air for 1 hour. Disks measuring 1 cm diameter by 0.1 cm thick were pressed and fired as described in Example 3 above.

The varistor precursor powders from Examples 3, 4 and 5 were measured by transmission electron microscopy to determine the relative average radius, R, of the zinc oxide particles and the relative average radius 4 of the additive metal oxide particles. The results are in Table 1.

TABLE 1

|  | r | R | r/R |
|---|---|---|---|
| Example 3 | .1 | .35 | .29 |
| Example 4 | .85 | .275 | 3.1 |
| Example 5 | .9 | .65 | 1.4 |

The sintered varistors from Examples 3, 4 and 5 were measured by ASTM E112-84, Procedure 10 to determine the average grain sizes. The results are in Table 2.

TABLE 2

|  | Average Linear Intercept Length, l, in microns | Grain Size D, in microns |
|---|---|---|
| Example 3 | 14.23 | 22.77 |
| Example 4 | 1.685 | 2.696 |
| Example 5 | 4.718 | 7.549 |

The sintered varistors from Examples 3, 4 and 5 were measured to determine the breakdown voltage per grain boundary. The dielectric constants were determined for the sintered varistors from examples 3A, 4 and 5. The results are in Table 3 and 4.

TABLE 3

|  | Breakdown Voltage per Grain Boundary Vgb, in volts |
|---|---|
| Example 3 | 4.256 |
| Example 4 | 2.272 |
| Example 5 | 1.56 |

TABLE 4

| | Dielectric Constant |
|---|---|
| Example 3A | 350 |
| Example 4 | 886 |
| Example 5 | 1064 |

We claim:
1. A process for preparing a metal oxide varistor precursor powder comprising at least one primary metal oxide and one or more additive metal oxides, which comprises the steps:
  (a) forming an aqueous solution comprising up to about 25 mole % (based on the additive metal oxides) of at least one soluble precursor of an additive metal oxide;
  (b) mixing in said aqueous solution up to about 75 mole % of at least one primary metal oxide powder selected from the group consisting of zinc oxide, titanium oxide, strontium oxide, strontium titanate, and mixtures thereof, having an average particle size up to about 5 microns to form a suspension or slurry of the primary metal oxide powder in said solution;
  (c) adding to the suspension or slurry a sufficient amount of a precipitation reagent to cause one or more of the dissolved additive metal oxide precursors to convert to an oxide or hydrous oxide and precipitate from said solution in the presence of said primary metal oxide powder in the form of an oxide or hydrous oxide;
  (d) removing water and by-product salts from the suspension of primary metal oxide powder and precipitate of additive metal oxide or hydrous oxide; and
  (e) drying the powder and precipitate and forming a metal oxide varistor precursor powder.

2. A process according to claim 1 wherein the water is removed in step (d) to form a wet powder and the drying in step (e) is by spray drying or freeze drying.

3. A process according to claim 1 wherein the primary metal oxide is zinc oxide.

4. A process according to claim 2 wherein the primary metal oxide is zinc oxide.

5. A process according to claim 4 wherein the additive metal oxides are selected from the group consisting of bismuth oxide, antimony oxide, manganese oxide, chromium oxide, cobalt oxide, boron oxide, and tin oxide.

6. A process according to claim 3 wherein the additive metal oxides are selected from the group consisting of bismuth oxide, antimony oxide, manganese oxide, chromium oxide, cobalt oxide, boron oxide, and tin oxide.

7. A process according to claim 3, wherein the additive metal oxides are selected from the group consisting of $Al_2O_3$, $B_2O_3$, $BaO$, $Bi_2O_3$, $CaO$, $CoO$, $Co_3O_4$, $Cr_2O_3$, $FeO$, $In_2O_3$, $K_2O$, $MgO$, $Mn_2O_3$, $Mn_3O_4$, $MnO_2$, $NiO$, $PbO$, $Pr_2O_3$, $Sb_2O_3$, $SiO_2$, $SnO$, $SnO_2$, $SrO$, $Ta_2O_5$, $TiO_2$ and mixtures thereof.

8. A process according to claim 4, wherein the additive metal oxides are selected from the group consisting of $Al_2O_3$, $B_2O_3$, $BaO$, $Bi_2O_3$, $CaO$, $CoO$, $Co_3O_4$, $Cr_2O_3$, $FeO$, $In_2O_3$, $K_2O$, $MgO$, $Mn_2O_3$, $Mn_3O_4$, $MnO_2$, $NiO$, $PbO$, $Pr_2O_3$, $Sb_2O_3$, $SiO_2$, $SnO$, $SnO_2$, $SrO$, $Ta_2O_5$, $TiO_2$ and mixtures thereof.

* * * * *